United States Patent
Maekawa et al.

(10) Patent No.: US 8,851,767 B2
(45) Date of Patent: Oct. 7, 2014

(54) MAGNETIC DRIVER, METHOD OF MANUFACTURING THE SAME, LIGHT AMOUNT CONTROLLER, AND OPTICAL APPARATUS

(75) Inventors: Satoshi Maekawa, Kawaguchi (JP); Akira Kurosawa, Saitama-ken (JP)

(73) Assignee: Canon Denshi Kabushiki Kaisha, Chichibu-shi (JP)

( * ) Notice: Subject to any disclaimer, the term of this patent is extended or adjusted under 35 U.S.C. 154(b) by 337 days.

(21) Appl. No.: 13/085,675

(22) Filed: Apr. 13, 2011

(65) Prior Publication Data
US 2011/0254993 A1 Oct. 20, 2011

(30) Foreign Application Priority Data
Apr. 16, 2010 (JP) ................. 2010-095234

(51) Int. Cl.
| | | |
|---|---|---|
| G03B 9/08 | (2006.01) | |
| G03B 9/02 | (2006.01) | |
| H02K 37/00 | (2006.01) | |
| H02K 33/16 | (2006.01) | |
| H02K 1/14 | (2006.01) | |
| G03B 9/14 | (2006.01) | |

(52) U.S. Cl.
CPC ............... *H02K 33/16* (2013.01); *H02K 1/145* (2013.01); *G03B 9/14* (2013.01)
USPC ............. 396/463; 396/508; 310/49.13

(58) Field of Classification Search
USPC ............ 396/463, 493, 508; 310/40 R, 310/49.13–49.14, 216.023
See application file for complete search history.

(56) References Cited

U.S. PATENT DOCUMENTS

| | | | |
|---|---|---|---|
| 4,659,952 A | * | 4/1987 | Unjo et al. ............ 310/90 |
| 4,897,681 A | | 1/1990 | Yamamoto et al. |
| 7,304,408 B2 | | 12/2007 | Mizumaki |

(Continued)

FOREIGN PATENT DOCUMENTS

| | | |
|---|---|---|
| JP | 10-032969 A | 2/1998 |
| JP | 10-248231 A | 9/1998 |

(Continued)

OTHER PUBLICATIONS

JP2008187832 A Machine Translation retrieved from JPO website.*

(Continued)

*Primary Examiner* — Clayton E Laballe
*Assistant Examiner* — Minh Phan
(74) *Attorney, Agent, or Firm* — Fitzpatrick, Cella, Harper & Scinto

(57) ABSTRACT

A magnetic driver includes a rotor magnet, a coil bobbin around which a coil is wound, and which has a through hole in a central portion, a yoke including a straight portion to be inserted into the through hole, and an arcuate portion connected to a distal end of the straight portion, a support member which rotatably supports the rotor magnet, and a thrust receiving member which includes an engaging portion to be engaged with the support member, has one surface which regulates one end of the rotor magnet in a thrust direction, and the other surface on which the coil bobbin is placed, and is held between the coil bobbin and the arcuate portion of the yoke. The yoke is assembled as an integrated yoke by inserting the straight portion into the through hole, and fixing the straight portion to the arcuate portion as another member.

10 Claims, 6 Drawing Sheets

(56) References Cited

U.S. PATENT DOCUMENTS

| | | | |
|---|---|---|---|
| 7,446,443 B2 | 11/2008 | Naganuma et al. | |
| 2004/0062542 A1* | 4/2004 | Watanabe | 396/463 |
| 2008/0050112 A1* | 2/2008 | Wernersson | 396/463 |
| 2008/0297009 A1* | 12/2008 | Yokoyama et al. | 310/49 R |
| 2008/0315699 A1* | 12/2008 | Suzuki et al. | 310/156.32 |

FOREIGN PATENT DOCUMENTS

| | | |
|---|---|---|
| JP | 2000-324787 A | 11/2000 |
| JP | 2003-052162 A | 2/2003 |
| JP | 2003-059021 A | 2/2003 |
| JP | 2005-102354 A | 4/2005 |
| JP | 2006-025491 A | 1/2006 |
| JP | 2006-333606 A | 12/2006 |
| JP | 2007-072356 A | 3/2007 |
| JP | 2007-093912 A | 4/2007 |
| JP | 2008-187832 A | 8/2008 |

OTHER PUBLICATIONS

Partial English-language translation of Japanese Patent Document No. 10-248231 A, paragraphs [0007] through [0013], with Figures 1 through 4.

* cited by examiner

F I G. 8
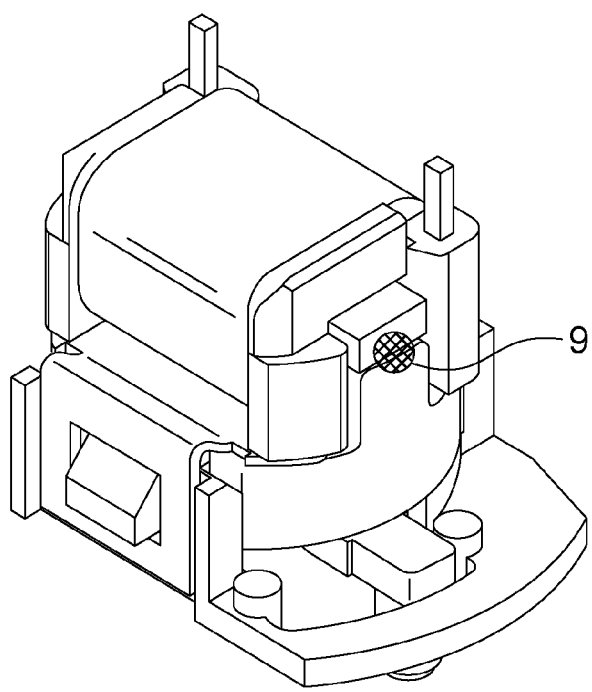

MAGNETIC DRIVER, METHOD OF MANUFACTURING THE SAME, LIGHT AMOUNT CONTROLLER, AND OPTICAL APPARATUS

BACKGROUND OF THE INVENTION

1. Field of the Invention

The present invention relates to a magnetic driver suitable for a shutter device or aperture device to be incorporated into an image sensing apparatus such as a video camera, a film-based camera, or a digital still camera, or suitable for an optical filter driver.

2. Description of the Related Art

A rotary actuator described in Japanese Patent Laid-Open No. 10-248231 is conventionally known as a cylindrical rotary actuator incorporating a coil in the direction of the rotating shaft of a magnetized rotor magnet.

This rotary actuator is characterized by including a rotor made of a permanent magnet, a main body case, which is made of a nonmagnetic material and accommodates the rotor by supporting it such that it can rotate in a predetermined angular range centered around its axis, a coil placed outside one end of the main body case in the axis direction, and formed by winding a wire around a bobbin, and a yoke made of a magnetic material having two ends bent to form an almost U-shaped section, an intermediate portion of the yoke being inserted into the coil, one end of the yoke being placed on one outer side surface of the main body case, and the other end of the yoke being placed on the other outer side surface of the main body case.

Also, as disclosed in Japanese Patent Laid-Open No. 2003-052162, a method has been proposed in which two bearings are used, a yoke is formed into a hook shape, and the two bearings are fixed by the hook of the yoke and a portion to be inserted into a coil bobbin, thereby forming an actuator.

In above-mentioned Japanese Patent Laid-Open No. 10-248231, however, the positioning of the rotor magnet and an arcuate magnetic pole portion of the yoke, which exerts a large effect on the driving accuracy, is performed on only a surface facing the rotor magnet on the outer circumferential surface of the main body case. Also, no method of positioning the two bearings of the rotor magnet has been disclosed. Furthermore, the hook of the yoke fixes the bearings and a cap in Japanese Patent Laid-Open No. 2003-052162. Similar to Japanese Patent Laid-Open No. 10-248231, the arcuate magnetic pole portion of the yoke is positioned on only a surface facing the rotor magnet. In addition, the complicated yoke shape may make the position of the arcuate magnetic pole portion unstable with respect to the rotor magnet.

SUMMARY OF THE INVENTION

The present invention has been made in consideration of the above situation, and its objective is to downsize the concentric outer shape of a rotor magnet of a magnetic driver, while avoiding the increase in number of components and the complication of the shape. Another objective of the present invention is to make it possible to reliably position a yoke with respect to the rotor magnet.

According to the first aspect of the present invention, a magnetic driver comprises: a rotor magnet; a coil bobbin around which a coil is wound, and which has a through hole in a central portion; a yoke including a straight portion to be inserted into the through hole, and an arcuate portion connected to a distal end of the straight portion; a support member which rotatably supports the rotor magnet; and a thrust receiving member which includes an engaging portion to be engaged with the support member, has one surface which regulates one end of the rotor magnet in a thrust direction, and the other surface on which the coil bobbin is placed, and is held between the coil bobbin and the arcuate portion of the yoke. The yoke is assembled as an integrated yoke by inserting the straight portion into the through hole of the coil bobbin, and fixing the straight portion to the arcuate portion as another member.

According to the second aspect of the present invention, a light amount controller comprises: the above magnetic driver; and an aperture blade, which is driven by the magnetic driver.

According to the third aspect of the present invention, an optical apparatus comprises: an image sensing element that photoelectrically converts an object image; and the above light amount controller.

According to the fourth aspect of the present invention, there is provided a method of manufacturing a magnetic driver comprising a rotor magnet, a coil bobbin around which a coil is wound and which has a through hole in a central portion, a yoke including a straight portion and an arcuate portion which are separate members in a state before assembly, a support member which rotatably supports the rotor magnet and has an abutment portion which abuts against the arcuate portion of the yoke, and a thrust receiving member having one surface which regulates one end of the rotor magnet in a thrust direction, and the other surface on which the coil bobbin is placed. The method comprises: making the arcuate portion abut against the abutment portion of the support member, thereby placing a portion of the thrust receiving member on a portion of the arcuate portion; fixing the arcuate portion to the straight portion inserted into the through hole of the coil bobbin, thereby holding the thrust receiving member between the arcuate portion and the coil bobbin; and rotatably supporting the rotor magnet by engaging the thrust receiving member with the support member.

Further features of the present invention will become apparent from the following description of exemplary embodiments with reference to the attached drawings.

BRIEF DESCRIPTION OF THE DRAWINGS

FIG. 8 is a perspective view of a finished product of the magnetic driver shown in FIG. 7.

DESCRIPTION OF THE EMBODIMENTS

Embodiments of a magnetic driver of the present invention will be explained in detail below with reference to the accompanying drawings.

First Embodiment

The basic configuration of a magnetic driver according to the first embodiment of the present invention will be explained below with reference to FIGS. 1 to 3.

Figure 1:
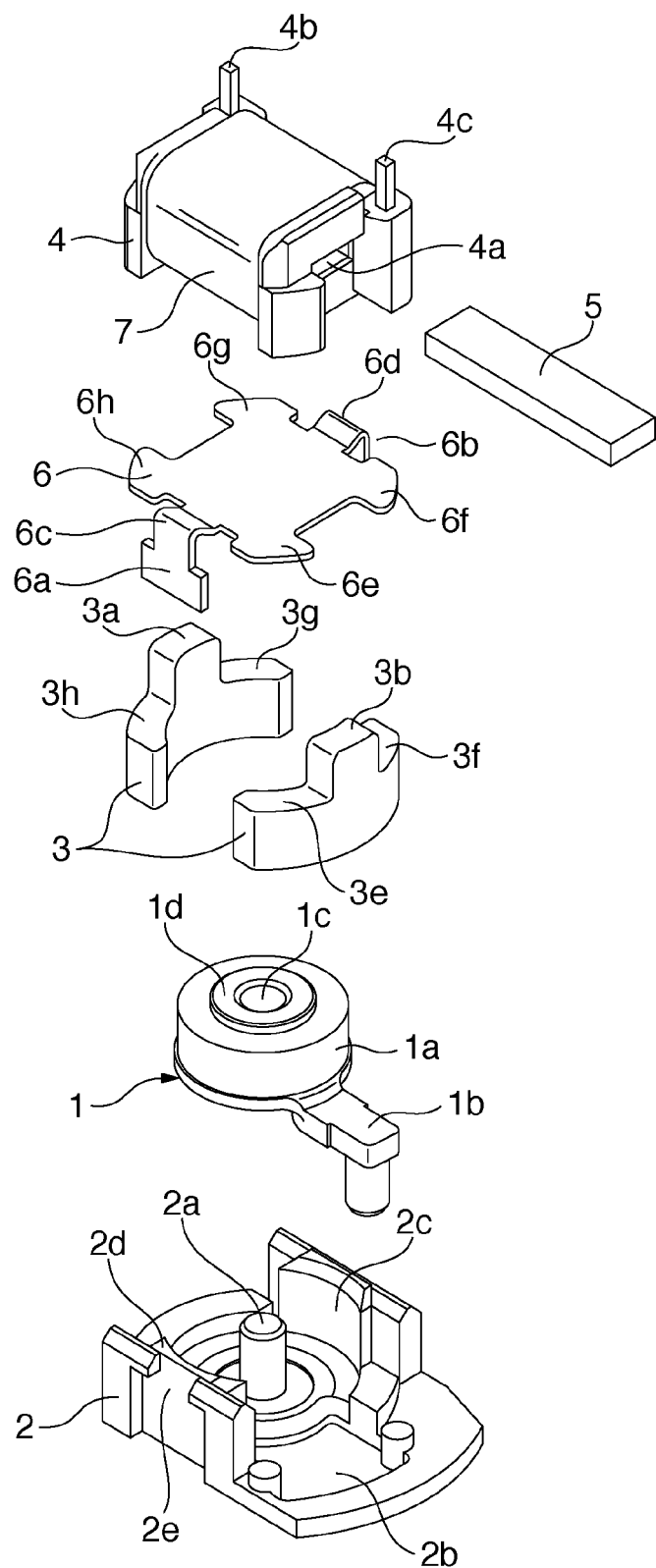
FIG. 1 is an exploded perspective view showing a magnetic driver according to the first embodiment of the present invention.

FIG. 1 is an exploded perspective view of the components of a cylindrical magnetic driver according to this embodiment. FIG. 2 is a perspective view after the components shown in FIG. 1 are assembled. FIG. 3 is a perspective view showing the lower surface side after the components shown in FIG. 1 are assembled.

Referring to FIG. 1, a rotor magnet 1 is formed by integrating a magnet 1a magnetized to two poles and an arm 1b. A shaft hole 1c as the rotational center of the rotor magnet 1 is formed in its center. A base plate 2 (support member) is the base of the cylindrical magnetic driver and is made of a nonmagnetic material. A rotating shaft 2a for rotatably axially supporting the rotor magnet 1 is integrated with the base plate 2 and protrudes from it. The rotating shaft 2a is inserted into the shaft hole 1c of the rotor magnet 1, and rotatably supports the rotor magnet 1 from the lower side (the other end). Note that the rotating shaft 2a is formed on the base plate 2 in this embodiment, but it is also possible to form a shaft on the rotor magnet and form a recess to be fitted on this shaft in the base plate 2.

Figure 3:
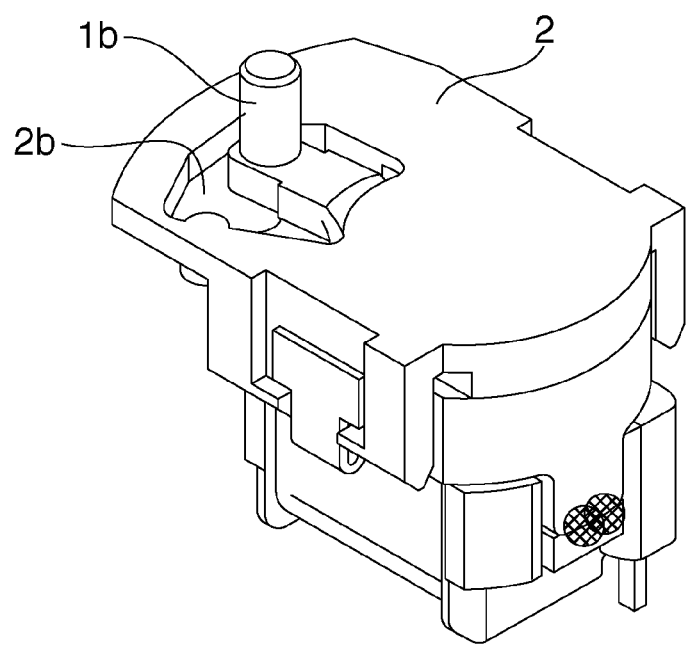
FIG. 3 is a perspective view of the lower surface side of the finished product of the magnetic driver shown in FIG. 1.

As shown in FIG. 3, the arm 1b of the rotor magnet 1 extends from a hole 2b in the base plate 2 toward the lower surface side of the base plate 2, and drives shutter blades (not shown) to be engaged with the arm 1b.

A through insertion hole (through hole) 4a is formed in the center of a coil bobbin 4 around which a coil 7 is wound. In this embodiment, a yoke includes separate members, that is, a rectangular parallelepiped yoke (bar-like yoke) 5 as a straight portion to be inserted into the insertion hole 4a of the coil bobbin 4, and a pair of arcuate magnetic pole portions 3 fixed to the two ends of the rectangular parallelepiped yoke 5 by welding or the like. The rectangular parallelepiped yoke 5 is not divided into a plurality of parts, but is formed as a single integral member. A structure like this simplifies the yoke shape and facilitates machining.

The rectangular parallelepiped yoke 5 is inserted into the insertion hole 4a of the coil bobbin 4, and the coil bobbin 4 is set above the central axis of the magnetic pole portions 3 in FIG. 1. The two ends of the rectangular parallelepiped yoke 5 are arranged in positions aligned with projections 3a and 3b of the magnetic pole portions 3 (to be described later).

In this state, a thrust pressing plate 6 (a plate member that regulates one end of the rotor magnet 1 in the thrust direction) is set between the coil bobbin 4 and magnetic pole portions 3. The thrust pressing plate 6 (a thrust receiving member) has one surface (lower surface) that regulates one end of the rotor magnet 1 in the thrust direction, and the other surface (upper surface) on which the coil bobbin 4 is placed. The purpose of the thrust pressing plate 6 is to prevent friction between one end of the rotor magnet 1 and the coil 7. Therefore, a member having a low surface sliding resistance is favorable. For example, it is effective to use a sheet member made of a resin material such as POM, a liquid crystal polymer, or PET, a metal, or a member obtained by performing corrosion protection on the surface of a metal and performing a process of decreasing the sliding resistance (lubricating surface treatment) on the surface. Furthermore, an end face 1d of the rotor magnet 1, which is brought into slidable contact with the thrust pressing plate 6, is desirably made as small as possible because the sliding friction decreases as the abutment area between the end face 1d and thrust pressing plate 6 decreases.

Also, the thrust pressing plate 6 must have spring properties. The thrust pressing plate 6 is bent into an almost U-shape. Distal ends 6a and 6b (engaging portions) of the bent portions at the two ends of the thrust pressing plate 6 are respectively fitted in grooves 2e and 2f of the base plate 2. Proximal ends 6c and 6d of the bent portions at the two ends of the thrust pressing plate 6 are bent toward the coil 4. Therefore, to hook the distal ends 6a and 6b of the bent portions at the two ends of the thrust pressing plate 6 in the grooves 2e and 2f of the base plate 2, the proximal ends 6c and 6d of the bent portions at the two ends of the thrust pressing plate 6 must be pushed in the direction of the base plate 2. In this manner, the distal ends 6a and 6b of the bent portions at the two ends of the thrust pressing plate 6 are respectively hooked and fixed in the groove 2e of the base plate 2 and the groove 2f (not shown) on the opposite side of the base plate 2. In this state, four corners (portions) 6e, 6f, 6g, and 6h of the thrust pressing plate 6 respectively push shoulders 3e, 3f, 3g, and 3h of the magnetic pole portions 3 downward. Consequently, the spring properties of the thrust pressing plate 6 generate a force that presses the magnetic pole portions 3 against the base plate 2, thereby preventing looseness between the base plate 2 and magnetic pole portions 3.

The rectangular parallelepiped yoke 5 set on projections (projecting portions) 3a and 3b of the magnetic pole portions 3 are fixed to the projections 3a and 3b by laser welding or the like. Thus, the thrust pressing plate 6 is held between the coil bobbin 4 and the magnetic pole portions 3 of the yoke.

Note that before the rectangular parallelepiped yoke 5 is inserted into the insertion hole 4a of the coil bobbin 4, it is also possible to fix or integrally form the rectangular parallelepiped yoke 5 and one of the magnetic pole portions 3 beforehand. In this case, the yoke obtained by integrating the rectangular parallelepiped yoke 5 and one magnetic pole portion 3, the coil bobbin 4, and the thrust pressing plate 6 are simultaneously assembled, and the other magnetic pole portion 3 is fixed after that. Although this more or less complicates the shape of one component forming the yoke, it is possible to decrease the number of fixing steps to one when assembling the driver, and position the magnetic pole portions as well.

Figure 2:
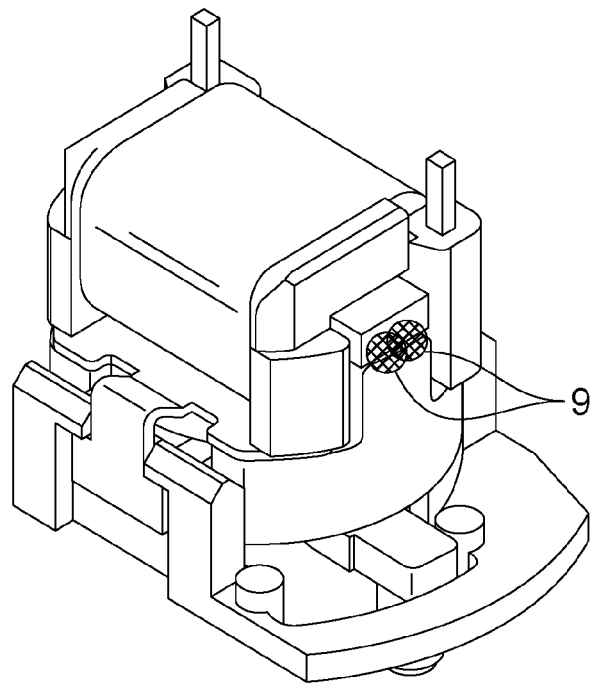
FIG. 2 is a perspective view of a finished product of the magnetic driver shown in FIG. 1.

Laser welding marks 9 shown in FIG. 2 indicate the state of laser welding. Two laser welding marks 9 are formed on each side between the rectangular parallelepiped yoke 5 and magnetic pole portions 3. Although not shown, laser welding is similarly performed on the other side. The number of laser welding portions is set to a number required to obtain a necessary strength. In this case, the magnetic resistance is desirably reduced by fixing the projections 3a and 3b of the magnetic pole portions 3 and the rectangular parallelepiped yoke 5 without any space between them. This fixation may be performed by a method called resistance welding or spot welding.

Also, the two ends of the coil wire of the coil 7 are connected to pins 4b and 4c fixed to the coil bobbin 4, so an electric current can be supplied to the coil 7 via a driving circuit (not shown) and the pins 4b and 4c.

Furthermore, the base plate 2 has projecting fitting portions 2c and 2d (abutment portions) on which the pair of magnetic pole portions 3 are fitted in accordance with the spacing between them. The pair of magnetic pole portions 3 are assembled into the base plate 2 as they abut against the fitting portions 2c and 2d and are positioned.

That is, in this embodiment, the coil bobbin 4, the rectangular parallelepiped yoke 5 to be inserted into the coil bobbin 4, and the magnetic pole portions 3 fixed to the rectangular parallelepiped yoke 5 are positioned with respect to the base plate 2. Also, since the base plate 2 has the rotating shaft 2a as the rotational center of the rotor magnet 1, the rotor magnet 1 and the magnetic pole portions 3 are accurately positioned. Furthermore, the spring properties of the thrust pressing plate 6 fix the magnetic pole portions 3 by pressing them against the base plate 2 without any looseness. Therefore, the rectangular parallelepiped yoke 5 fixed to the magnetic pole portions 3 and the coil bobbin 4 into which the rectangular parallelepiped yoke 5 is inserted are also fixed to the base plate 2. The magnetic driver of this embodiment is thus manufactured.

Next, the operation of the cylindrical magnetic driver constructed as described above will be explained below.

When a positive electric current is supplied to the coil 7, the yoke functions as an electromagnet and the pair of magnetic pole portions 3 function as magnetic poles because the rectangular parallelepiped yoke 5 exists inside the coil 7. Due to the poles of the arcuate portions, the rotor magnet 1 causes attraction and repulsion and rotates in a magnetically stable direction, and the arm 1b rotates. When a reverse electric current is supplied to the coil 7, the poles of the magnetic pole portions 3 reverse, and the attraction and repulsion also reverse, so the arm 1b reversely rotates. Thus, the rotational direction of the rotor magnet 1 changes in accordance with the direction in which the electric current is supplied to the coil 7. As a consequence, the rotational direction of the arm 1b changes, and the driving direction of the shutter blades (not shown) changes. Accordingly, the shutter blades perform an opening/closing operation. The driving range of the arm 1b can be regulated by the hole 2b in the base plate 2 or by the shutter blades.

Also, even when the supply of the positive or reverse electric current is stopped, the detent torque holds the position of the rotor magnet 1 in the state in which the electric current is supplied.

Figure 4:
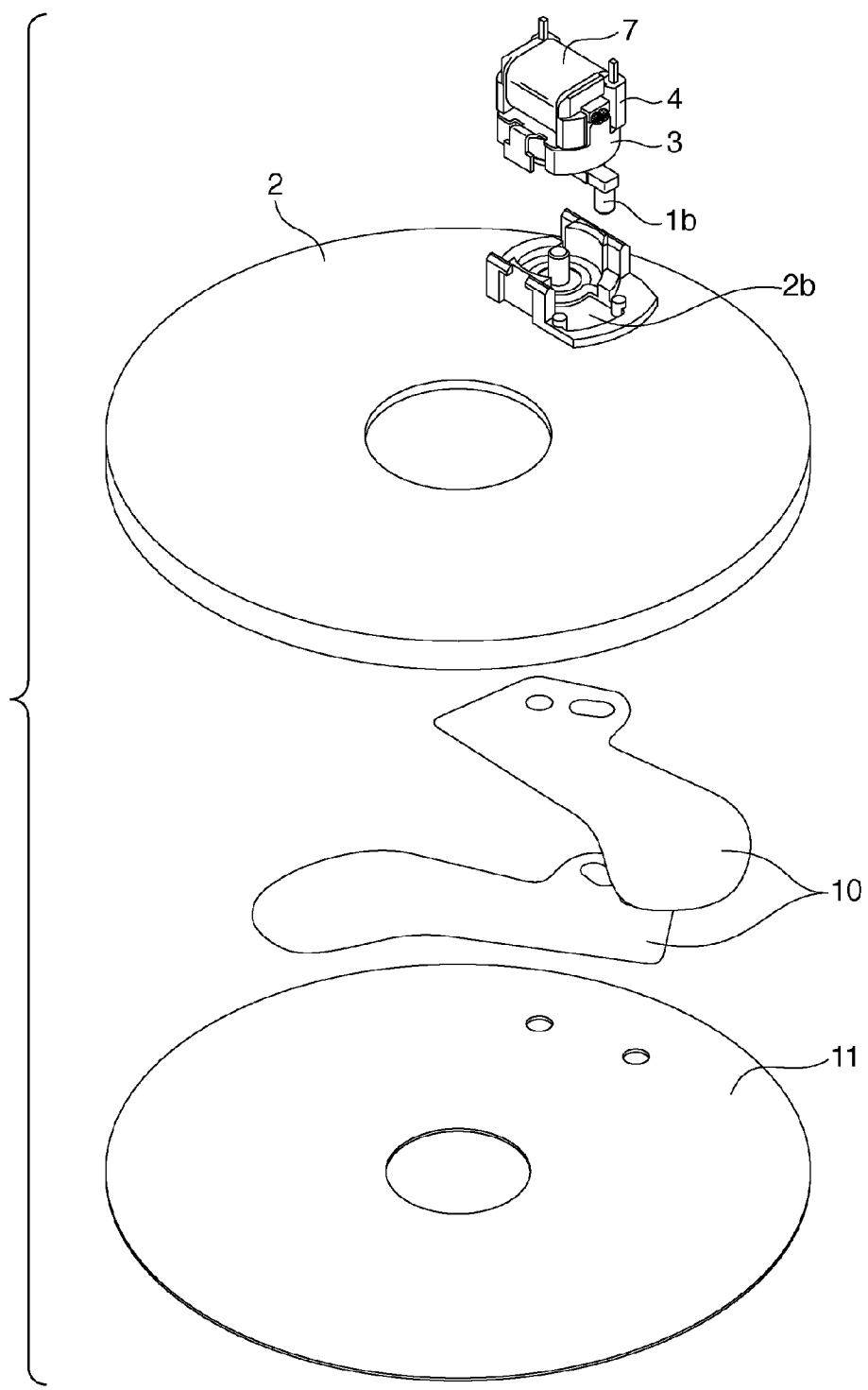
FIG. 4 is an exploded perspective view showing a shutter device incorporating the driver of the first embodiment.

FIG. 4 is a view showing an example of a shutter device using the magnetic driver of this embodiment.

Figure 5:
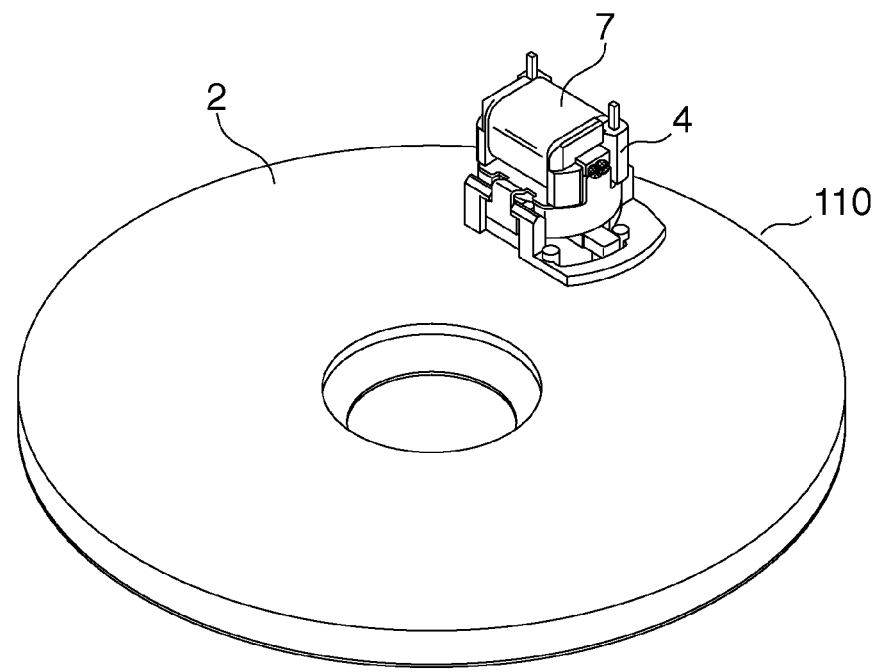
FIG. 5 is a perspective view showing the assembled state of the shutter device incorporating the driver of the first embodiment.

In the shutter device according to this embodiment as shown in FIG. 4, the base plate 2 is integrated with a shutter frame. Shutter blades 10 are engaged with the arm 1b extending from the hole 2b in the base plate 2 toward the lower surface side of the base plate 2, and covered with a cover plate 11. FIG. 5 shows an assembled shutter device 110.

Figure 6:
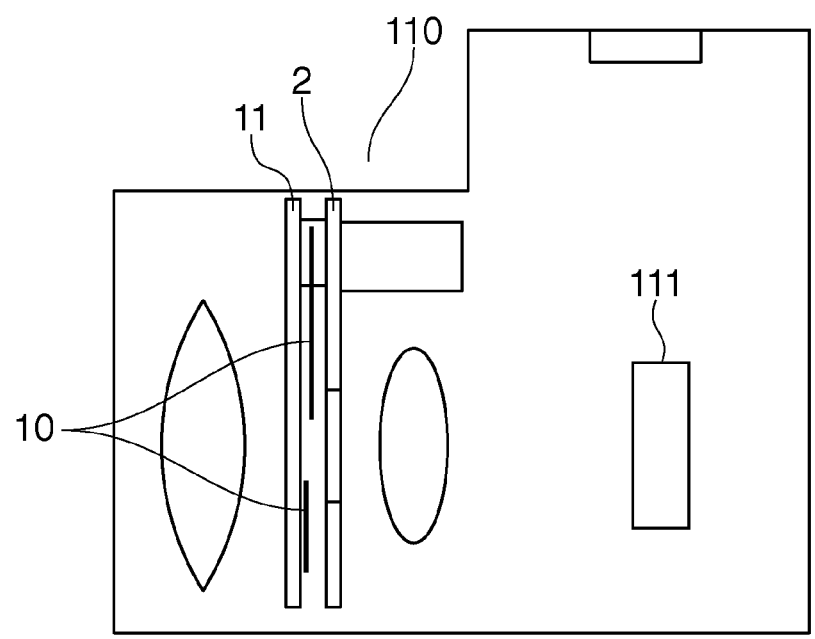
FIG. 6 is a view showing an optical apparatus incorporating the shutter device shown in FIG. 5.

FIG. 6 shows an example of an optical apparatus including the shutter device shown in FIG. 5. In this embodiment, the optical apparatus is a digital still camera. Other examples of the optical apparatus incorporating the above-described magnetic driver or the shutter device 110 as shown in FIG. 5 are a video camera and a film-based camera. Note that reference numeral 111 in FIG. 6 denotes an image sensing element for photoelectrically converting an object image.

With the arrangement as described above, the magnetic driver of this embodiment can simplify the yoke shape and the structure of positioning the yoke and rotor magnet. In the arrangement as described above, the structure in which the magnetic pole portions 3 are fixed to the base plate 2 makes it possible to simply and reliably connect these members without any looseness.

Also, even in the arrangement as described above, the concentric outer shape of the rotor magnet can be downsized, that is, the outer shape of the magnetic driver can be downsized without decreasing the driving torque, for example, without decreasing the number of turns of the coil. Furthermore, highly accurate compact apparatuses can be provided when using the above-mentioned magnetic driver in a light amount controller and in an optical apparatus such as a digital still camera.

Second Embodiment

Figure 7:
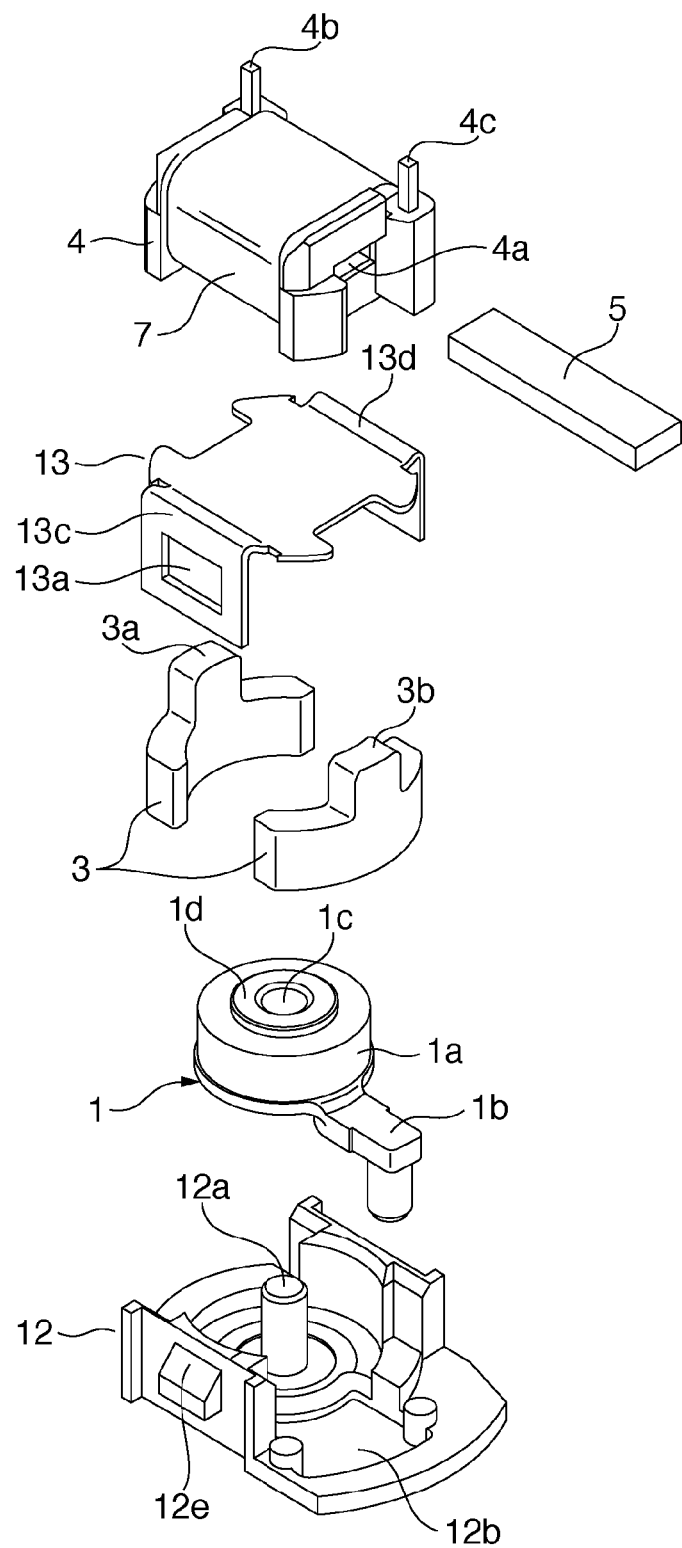
FIG. 7 is a perspective view showing a magnetic driver of the second embodiment.

FIG. 7 shows another configuration example of a method of connecting a thrust pressing plate and base plate as the second embodiment.

Referring to FIG. 7, a thrust pressing plate 13 is bent into am almost U-shape as in the first embodiment. A hole 13a is formed in the distal end of the bent portion at one end of the thrust pressing plate 13, and a similar hole is formed in the distal end of the bent portion at the other end. A pawl 12e is formed on one side surface of a base plate 12, and a similar pawl is formed on the other side surface. The holes in the distal ends of the bent portions at the two ends of the thrust pressing plate 13 are locked by the pawls.

As in the first embodiment, proximal ends 13c and 13d of the bent portions at the two ends of the thrust pressing plate 13 are bent toward a coil 4. Therefore, the proximal ends 13c and 13d of the bent portions at the two ends of the thrust pressing plate 13 must be pushed in the direction of the base plate 12. This effectively prevents looseness between the base plate 12 and magnetic pole portions 3 as in the first embodiment.

FIG. 8 is a perspective view after the components shown in FIG. 7 are assembled. A laser welding mark 9 shown in FIG. 8 indicates the state of laser welding. The laser welding mark 9 is formed on each side between a rectangular parallelepiped yoke 5 and the magnetic pole portions 3. Although not shown, laser welding is similarly performed on the other side. The number of laser welding portions is set to a number required to obtain a necessary strength. In this case, the magnetic resistance is desirably reduced by fixing projections 3a and 3b of the magnetic pole portions 3 and the rectangular parallelepiped yoke 5 without any space between them. This fixation may be performed by using a method called resistance welding or spot welding.

As explained above, the above-mentioned configuration makes it possible to simply and reliably connect the magnetic pole portions 3 to the base plate 12 without any looseness by fixing the former to the latter. Consequently, it is possible to decrease the size and increase the accuracy of a light amount controller using the magnetic driver, and decrease the size and increase the accuracy of an optical apparatus such as a video camera or digital camera using the light amount controller.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2010-095234, filed Apr. 16, 2010, which is hereby incorporated by reference herein in its entirety.

What is claimed is:
1. A magnetic drive apparatus comprising:
a coil bobbin around which a coil is wound;
a bar-like yoke that is inserted into a through hole formed in said coil bobbin so that each end protrudes outside the through hole;
a pair of magnetic pole members magnetically connected to each end of said yoke protruding outside the through hole;
a rotor magnet arranged between said pair of magnetic pole members; and
a base plate rotatably supporting said rotor magnet; and
a pressing member that sets a relative position of said rotor magnet and said pair of magnetic pole members with respect to said base plate, wherein said bar-like yoke and said magnetic pole members are separate members, said magnetic pole members in a separated state are positioned between said base plate and said pressing member, and said bar-like yoke and said magnetic pole members are fixed to each other after said bar-like yoke is inserted into the through hole.

2. The apparatus according to claim 1, wherein said pressing member regulates movement of said rotor magnet in a thrust direction.

3. The apparatus according to claim 2, wherein said pressing member is arranged between said coil bobbin and said rotor magnet.

4. The apparatus according to claim 2, wherein said rotor magnet is rotatable between said base plate and said pressing member.

5. The apparatus according to claim 2, wherein a rotational element, which rotatably supports said rotor magnet, protrudes from said base plate, and said pressing member presses said rotor magnet, which is fitted to the rotational element, towards said base plate.

6. The apparatus according to claim 5, wherein said rotor magnet has a hole through which the rotational element is inserted, and wherein a peripheral area of the hole on a surface of the rotor magnet facing to said coil bobbin slidably contacts said pressing member.

7. The apparatus according to claim 2, wherein said pressing member presses said pair of magnetic pole members magnetically connected to each end of said yoke against said base plate.

8. The apparatus according to claim 1, wherein said pair of magnetic pole members are connected to said yoke by welding.

9. A light amount adjustment apparatus comprising the magnetic drive apparatus according to claim 1.

10. An optical apparatus comprising the light amount adjustment apparatus according to claim 9.

* * * * *